United States Patent

Singleterry et al.

[11] Patent Number: 5,820,715
[45] Date of Patent: Oct. 13, 1998

[54] METHOD OF MAKING FLOW MONITORING LINE STRAINER HAVING FLOW INDICATING ELEMENT

[75] Inventors: Ronald Clinton Singleterry, Bell Buckle; John Zavisa, Murfreesboro, both of Tenn.

[73] Assignee: Standex International Corporation, Murfreesboro, Tenn.

[21] Appl. No.: 929,700

[22] Filed: Sep. 15, 1997

Related U.S. Application Data

[62] Division of Ser. No. 595,203, Feb. 1, 1996, Pat. No. 5,717,137.

[51] Int. Cl.$^6$ .............................. B32B 31/16; G01F 1/20
[52] U.S. Cl. ............... 156/73.1; 29/896.62; 73/861.55; 73/861.57; 73/861.58; 210/94; 210/232; 210/446; 96/416
[58] Field of Search .................... 29/896.62; 210/87, 210/93, 94, 95, 136, 232, 435, 446, 516; 96/414, 415, 416, 417, 422, 423; 73/239, 861.58, 861.57, 861.56, 861.55, 861.54; 228/110.1; 156/73.1

[56] References Cited

U.S. PATENT DOCUMENTS

| | | | |
|---|---|---|---|
| 828,108 | 8/1906 | Graham | 73/861.57 |
| 972,282 | 10/1910 | Stamets | 210/94 |
| 3,000,504 | 9/1961 | Pfeiffer | 210/94 |
| 3,183,713 | 5/1965 | Gilmont . | |
| 3,317,043 | 5/1967 | Vanderpoel | 210/94 |
| 3,835,885 | 9/1974 | Kreyenberg | 137/551 |
| 3,914,995 | 10/1975 | Yoshida . | |
| 3,992,296 | 11/1976 | Nobuta | 2109/90 |
| 4,173,890 | 11/1979 | Gilmont . | |
| 4,317,375 | 3/1982 | Egert . | |
| 4,365,648 | 12/1982 | Grothe . | |
| 4,368,646 | 1/1983 | Rogg . | |
| 4,453,418 | 6/1984 | Rousseau et al. | 73/861.58 |
| 4,601,820 | 7/1986 | Leason | 210/94 |
| 4,699,617 | 10/1987 | Moriuchi et al. | 73/861.57 |
| 4,759,842 | 7/1988 | Frees et al. | 210/94 |
| 5,078,862 | 1/1992 | Justice | 210/94 |
| 5,085,076 | 2/1992 | Engelmann . | |
| 5,398,721 | 3/1995 | Pryor . | |
| 5,717,137 | 2/1998 | Singleterry et al. | 73/239 |

*Primary Examiner*—Joseph W. Drodge
*Attorney, Agent, or Firm*—Luedeka, Neely & Graham, P.C.

[57] ABSTRACT

A line strainer for screening fluid flow in a small diameter conduit is constructed with an integral housing of clear or transparent thermoplastic polymer. A fluid flow channel through the housing center is terminated at opposite ends by sonically welded end fittings. Internally of the housing, a screen chamber is separated from a flow meter chamber by a screen support hub with flow diversion passages. The screen chamber confines a conically formed screen mesh for passing substantially all flow through the housing. The flow meter chamber has conically tapered walls that support radial fins projecting from the walls inwardly to a cylindrical void that confines the metering ball to displacement along the housing axis. A spring bearing against the metering ball resiliently biases the ball toward the flow restriction passage and against the fluid flow direction. The spring bias and conically tapered meter walls cooperate with the flow stream and metering ball to stabilize at a position along the housing axis that is proportional to the flow rate through the screen. As the screen mesh fills to increase flow stream resistance, the metering ball approaches the flow restriction passage signaling a reduced flow rate. The degree of plugging or filling of the screen mesh is therefore indicated by the relative position of the metering ball for a substantially constant pressure source. Additionally, pump performance or system blockage could also be detected by the ball position in the flow meter chamber.

12 Claims, 3 Drawing Sheets

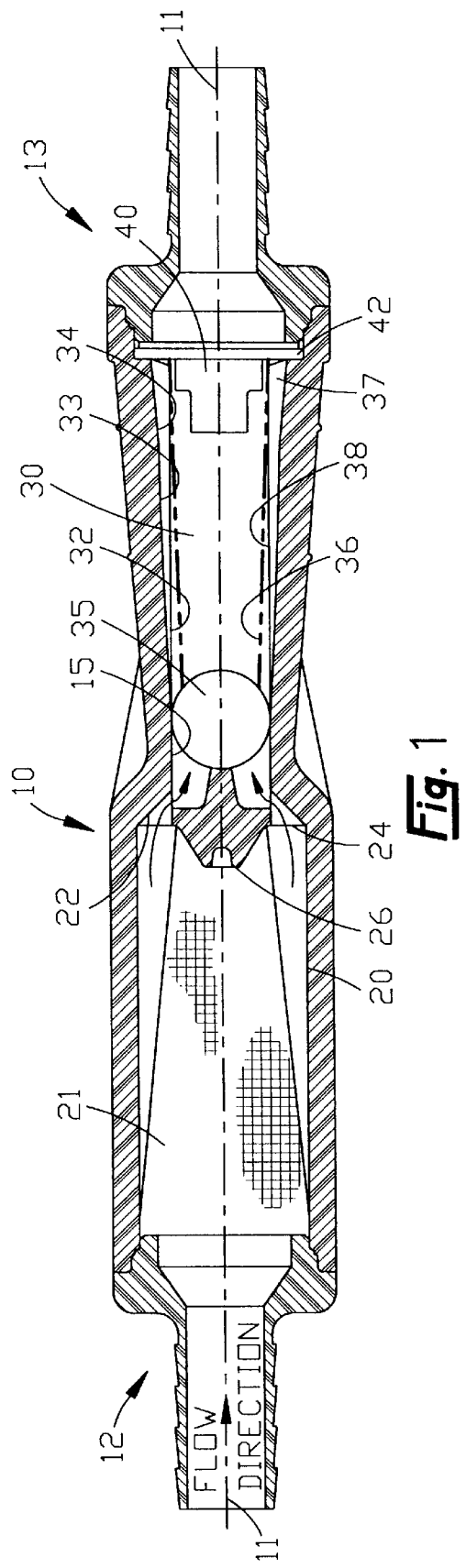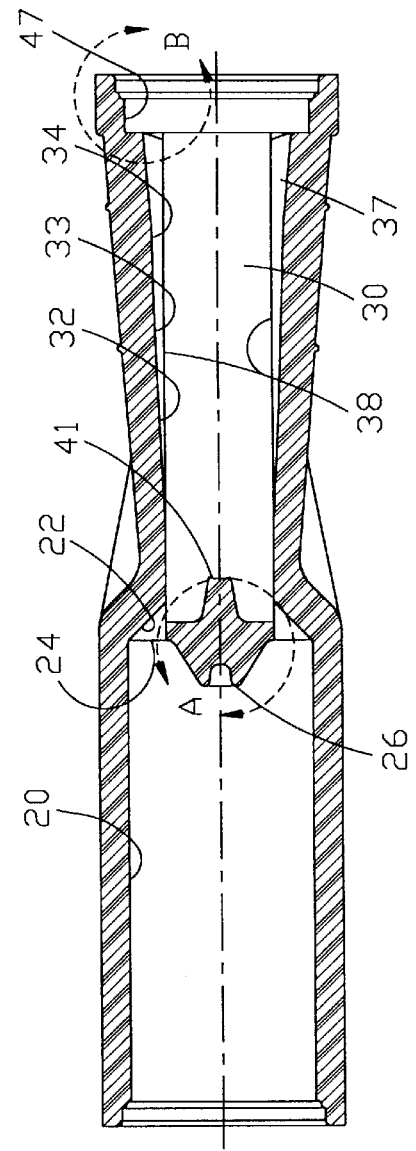

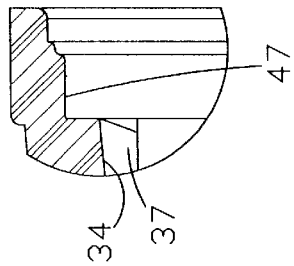
Fig. 6
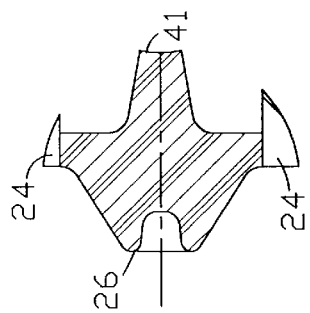
Fig. 5
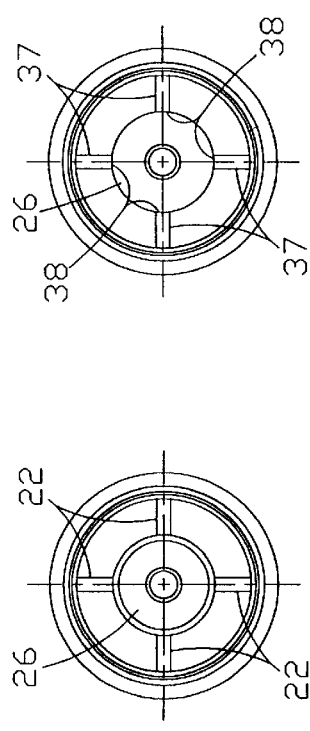
Fig. 4
Fig. 3
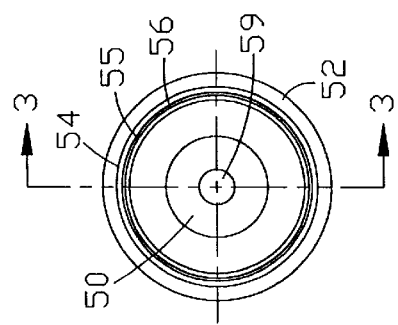
Fig. 10
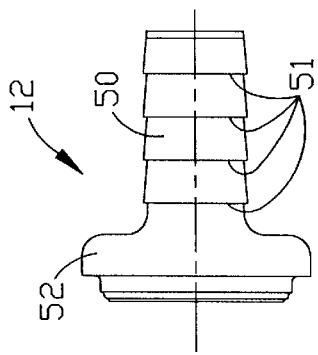
Fig. 9
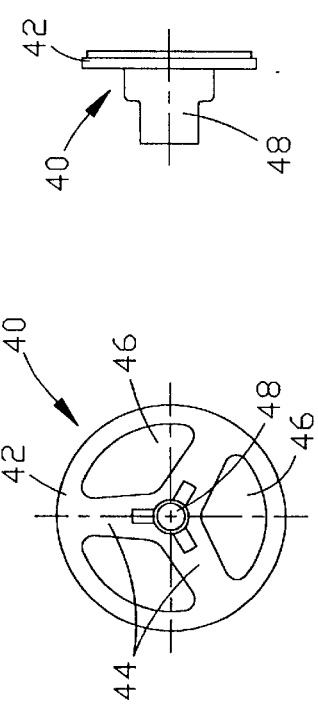
Fig. 8
Fig. 7

METHOD OF MAKING FLOW MONITORING LINE STRAINER HAVING FLOW INDICATING ELEMENT

This application is a division of now application Ser. No. 08/595,203, filed Feb. 1, 1996, now U.S. Pat. No. 5,717,137.

BACKGROUND OF THE INVENTION

The present invention relates to relatively small fluid flow handling equipment and in particular, to a disposable fluid flow screen for mechanical tubing or hydraulic conduit.

Many fluids carried within mechanical tubing are screened or otherwise filtered at strategic locations to remove undesirable particulates. Such screening may be motivated by the need to protect expensive flowline equipment such as pumps and valves or by the need to purge the fluid flow stream of materials that are unsanitary or corruptive of a production process.

Screen or filter systems for mechanical tubing flow streams are complicated by the nature and degree of required particulate removal, the size range of the particulates and many other factors. Many filtration applications, however, are relatively simple and require only that relatively large, occasionally delivered particles be retained on the screen. In these cases, automatic screen cleaners or pressure monitors for maintaining the operational integrity of the system are simply not economically justified. In many cases, the cost of labor to clean a screen exceeds the value of the screen but the economics are incremental. Most of the labor cost resides in simply removing the screen from its operational enclosure.

From another perspective, without a somewhat sophisticated pressure and flow monitoring system across a screen body, it has heretofore been extremely difficult to determine for a certainty that a screen needed to be cleaned or changed. This was simply a consequence of the enclosure surrounding the screen and the lack of visual or other direct sensory perceptions that the screen mesh openings within the enclosure were filled or blocked and were no longer passing fluid to the degree required of the system.

It is an objective of the present invention therefore to provide an inexpensive and disposable flow screen for mechanical tubing carried fluid flow streams.

Another object of the present invention is to provide a fluid flow screen that incorporates a means to determine if the screen is loaded and in need of replacement.

A further object of the present invention is to combine a fluid flow metering means with a fluid flow screen to reveal the screen status of plugging.

Also an object of the present invention is an integrated screen and fluid flow meter that may be operationally positioned in any desired orientation.

An additional object of the present invention is to provide an integrated screen and fluid flow meter of such simple construction and inexpensive fabrication as to be disposable when filled.

SUMMARY OF THE INVENTION

These and other objects of the present invention are served by a replaceable, axial flow line strainer that is fabricated with substantially transparent housing walls to facilitate visual monitoring of a conically tapered internal flow screen and a displaced ball type of flow meter. Under a generally known pressure differential across the strainer the flow meter resistance ball finds a stable operating position that balances the impulse force of fluid flow against the resistance ball with the force of an opposing coil spring biased against the ball. A range of normal operating positions will be observed and possibly marked by equipment operators as an analog reference to an expected flow rate through the meter flow channel.

Although the effect of the spring bias is to introduce an element of inaccuracy to a pure flow rate monitoring function of the invention, extreme accuracy of flow measurement is not the meter objective. In the interest of accuracy and elimination of non-linear error sources, prior art floating ball meters normally have no bias on the ball except for gravity. For that reason alone, gravity biased floating ball meters are restricted to an upflow column orientation. Flexibility of orientation is of greater priority with the present invention which may be installed in a downflow column or a horizontal run.

Over time, depending on the fluid flow system and operating conditions, the screen will begin to plug or fill thereby rising in flow resistance. A direct consequence of increased flow resistance is either increased pressure differential to maintain a constant flow rate through the screen or, alternatively, a reduced flow rate at a constant pressure differential. Under those operating conditions where the pressure differential across the strainer is either known or substantially constant, the location of the displaced ball is a direct indication of the fluid flow rate against the ball and the degree of screen obstruction.

The flow strainer housing is preferably molded from a clear or transparent thermoplastic compound. Under construction, the flow screen and flow meter ball are positioned and housing ends are secured by end fittings that are sonically welded in place. The integrity and strength of the sonic or ultrasonic weld is maximized by a stepped socket interface between the housing ends and the end fittings. Externally, the end fittings, which are usually molded of the same polymer as the housing, are formed with circumferential barbs to secure flexible conduit or with threads to attach rigid conduit.

BRIEF DESCRIPTION OF THE DRAWINGS

Further details and advantages of the invention may be inferred from a preferred invention embodiment illustrated by the following drawings wherein:

FIG. 1 is a longitudinal cross section of the invention;

FIG. 2 is a longitudinal cross section of the invention housing;

FIG. 3 is an end view of the housing at the flow entrance end;

FIG. 4 is an end view of the housing at the flow exit end;

FIG. 5 is an enlarged detail of FIG. 2 area A showing the screen hub viewed along a longitudinal cross section;

FIG. 6 is an enlarged detail of the FIG. 2 area B showing the housing end cap socket at the flow exit end.

FIG. 7 is a frontal view of the metering spring guide hub.

FIG. 8 is a side view of the metering guide hub.

FIG. 9 is a side view of the invention end cap;

FIG. 10 is an interior end view of the invention end cap;

DESCRIPTION OF THE PREFERRED EMBODIMENT

Figure 12:
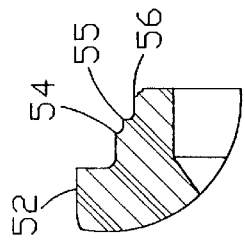
FIG. 12 is an enlarged detail of the FIG. 11 area 4.

Relative to the drawings wherein like reference characters designate like or similar elements throughout the several figures of the drawings, the section of FIG. 1 illustrates the invention along a cutting plane passing through the longitudinal axis 11 of a tubular housing 10. Circular end openings of the housing 10 receive end caps 12 and 13. Preferably, the housing 10 and end caps are molded or machined from a substantially clear or transparent high density polymer such as the styrene-acrylonitrile TYRIL 1000B produced by The Dow Chemical Co. of Midland, Mich. Alternatively, the housing may be fabricated of translucent or partially translucent plastics and strongly backlighted for a qualitative interpretation of the ball position and flow rate.

Internally, the housing 10 encloses two chambers aligned in series along the flow axis 11 and separated by a flow restricting throat 15. Relative to the axial flow direction indicated by the flow direction arrow, the first chamber 20 is substantially cylindrical with smooth, internal wall faces along the chamber length. The exit or downstream end of the chamber is terminated by a conical end wall face 22. Radiating inwardly toward the axis 11 from the conical end wall face are a plurality of triangular ribs or fins 24. The base edge of such ribs 24 is substantially parallel with the housing axis 11 to collectively form a circle of seating points for the screen hub 26 as best illustrated by FIGS. 3 and 5. Flow line arrows on FIG. 1 between the hub 26 and the conical end wall face 22 indicate the fluid flow path past the hub 26 into the flow throat 15.

Figure 14:
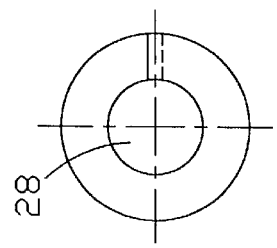
FIG. 14 is an end view of the flow screen.
Figure 13:
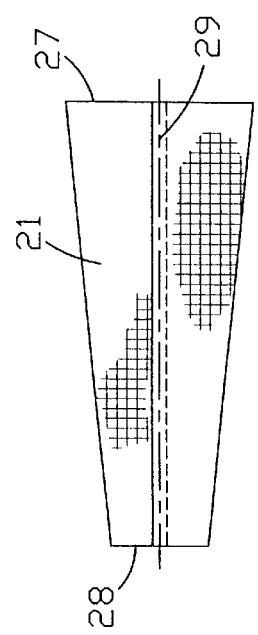
FIG. 13 is a side view of the flow screen.

The flow screen 21 within the screen chamber 20, illustrated independently by FIG. 13 and 14, is flat woven screen material rolled to the surface configuration of a truncated cone and joined along a lap seam 29 between a circular base 27 and a circular apex 28. The screen base circle 27 is substantially of the same diameter as the screen chamber bore wall 20 whereas the apex circle 28 diameter is coordinated to fit over the base of screen hub 26. Consequently, substantially all fluid flow through the chamber 20 must pass through the screen mesh openings.

The flow screen 21 may be woven of any material compatible with the fluid flowing through the screen. As a general example, a 0.005 in. diameter of UNS S 30400 stainless steel wire may be woven to a mesh having a 100 by 90 grid.

The second chamber within the housing 10 is a flow metering chamber 30 having a divergent inside wall enclosing a flow metering plug or ball 35 as a flow indicating element. The plug is biased into the throat 15 of the flow conduit by a tapered coil spring 36. An abutment point 41 integral with the screen hub 26 limits the depth that the plug 35 is permitted to penetrate into the throat 15. For the plug 35, the preferred embodiment of the invention uses a black polymer sphere. Such a sphere is about 0.28 in diameter, although other shapes such as oval, conical or cylindrical may also be used. Suitably, the acetyl resin DELRIN, a product of the DuPont Co., Wilmington, Del., may be used as a material source.

The wall of chamber 30 is formed in three conical sections, 32, 33 and 34 that enclose a flow volume geometry in which the cross-sectional flow area increases as a direct, graduated function of the distance that an area segment is positioned along the flow direction from the throat 15. The first section 32 and third section 34 each have greater conical angles than middle section 33 to provide a progressively enlarged annular cross-sectional flow area between the plug 35 and the walls of the chamber 30. Consequently, this area increases as the plug 35 is displaced along the flow axis 11 from the throat 15 by fluid flow impulse against the progressive bias of tapered spring 36 thereby indicating the flow through the strainer and allowing judgment to the degree of strainer obstruction. Three or more thin, longitudinal ribs 37 radiate inwardly from the divergent chamber walls to terminate along a base edge 38 parallel with the flow axis 11. Collectively, the several rib edges 38 form a guide channel to confine the plug 35 within an axially aligned displacement path.

The plug biasing spring 36 is a tapered coil. In a particular, preferred embodiment of the invention the tapered coil spring 36 was wound from about 0.009 in. diameter UNS S 30200, stainless steel wire. The base coil was about 0.275 in. dia. and the ball bearing coil about 0.240 in. Free length of the spring was about 1.94 in., with 28–29 coils. The spring rate was about 8.0 gms/in.

Although many alternative spring base retainer 40 configurations may be devised, the preferred embodiment of FIGS. 7 and 8 uses a spoked wheel having a continuous outer perimeter 42 that seats in a counterbored section 47 of the housing exit flow end as shown by FIG. 6. Between the spokes 44 are open flow areas 46. At the center of the wheel is a centering pin 48 that penetrates the internal coil opening of spring 36.

The screen 21 and spring 36 are respectively secured at opposite ends of the housing by end caps 12 and 13. Preferably, both end caps are substantially identical in material which is the same material as the housing 10. It is also preferred that the end caps 12 and 13 are substantially identical dimensionally so as to be interchangeable.

Figure 11:
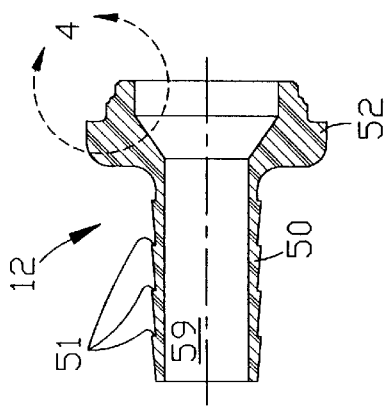
FIG. 11 is a longitudinal cross section of the end cap viewed along cutting plane 3—3 of FIG. 10.

Referring to FIGS. 1, 9, and 11, the illustrated embodiment of the end cap 12 is provided with a plurality of hose barbs 51 around the outer perimeter of a hose nib 50 having a fluid flow bore 59 axially therethrough. Traditional assembly of this configuration with a hose or elastomer wall tubing requires the nib 50 to penetrate a hose section end. Hose clamps encircle the portion of hose surrounding the nib 50 to press the elastomer material of the hose into the barbs 50 thereby securing the hose connection with the respective end cap. The hose nib 50 projects integrally from the outer side of the end cap 12 shoulder 52. This nib 50, if desired, may be fabricated with tubing threads, pipe threads or O-ring style quick-connects to secure the desired conduit.

On the interior side of the end cap shoulder 52 as shown by FIGS. 10, 11 and 12, is a male interface structure comprising several step landings 54, 55 and 56. A corresponding female interface structure illustrated by FIGS. 3, 4 and 5 is formed around the housing end openings for receiving the end caps 12 and 13. Particular note should be taken from FIG. 12 of the reverse risers between steps 54 and 55 and between steps 55 and 56 which constitute sonic welding energy directors. It is to be further noted that such reverse risers are not provided for in the female housing interface. These two stepped interface surfaces are joined by sonic welding processes. While under compressive stress, sonic energy stimulation melts the plastic along the stepped interface to induce a material fusion between the housing and end cap elements for a seamless joint therebetween having great strength and fluid seal integrity.

Having fully disclosed the preferred embodiments of my invention, obvious variations and equivalencies will readily occur. to those of ordinary skill in the art. As our invention, however,

We claim:

1. A method of fabricating a fluid flow line strainer comprising the steps of:

forming an axially elongated housing element having substantially transparent walls and a flow channel therethrough along an axis between a flow inlet end and a flow exit end, said flow channel including first and second chambers separated by a flow restrictive passage;

positioning a flow screen within said first chamber to screen substantially all fluid flow along said flow channel;

positioning a resiliently biased flow resistance within said second chamber, said resistance having a substantially stabilized position within said second chamber corresponding to a distinctive fluid flow rate along said flow channel; and fusing an end cap to each end of the housing element, the end caps each having a step landing structure for directing sonic welding energy, the fusing comprising sonic welding.

2. A method of fabricating a fluid flow line strainer as described by claim 1 comprising the additional step of:

securing conduit connection fittings to said housing element at opposite axial ends of said flow channel.

3. A method of fabricating a fluid flow line strainer as described by claim 1 comprising the step of forming interfacing surfaces respective to said conduit connection fittings and opposite axial ends of said housing into a plurality of meshing steps.

4. A method of fabricating a fluid flow line strainer as described by claim 1 comprising the steps of:

tapering internal walls of said second chamber to provide a transverse flow area that increases along said flow channel from said flow restrictive passage.

5. A method of fabricating a fluid flow line strainer as described by claim 4 wherein said tapering internal walls have fins projecting radially inwardly to a cylindrical passage space along said axis to guide said flow resistance.

6. A method of fabricating a fluid flow line strainer as described by claim 5 wherein said flow resistance is generated by fluid flow along said flow channel to displace a sphere along said cylindrical passage space against the resilient bias of a spring.

7. A method of fabricating a fluid flow line strainer comprising the steps of:

forming an axially elongated housing element having substantially transparent walls and a flow channel therethrough along an axis between a flow inlet end and a flow exit end, said flow channel including first and second chambers separated by a flow restrictive passage;

positioning a flow screen within said first chamber to screen substantially all fluid flow along said flow channel;

fusing a first end cap to the flow inlet end of said housing element to confine said flow screen within said first chamber;

positioning a resiliently biased flow resistance element within said second chamber, said resistance element having a substantially stabilized position within said second chamber corresponding to a distinctive fluid flow rate along said flow channel; and, fusing a second end cap to the flow exit end of said housing element to confine said flow resistance element within second chamber, the first and second end caps each having a step landing structure for directing sonic welding energy, for each end cap the fusing comprising sonic welding.

8. A method of fabricating a fluid flow line strainer as described by claim 7 comprising the additional step of:

providing said first and second end caps with conduit connection fittings at opposite axial ends of said flow channel.

9. A method of fabricating a fluid flow line strainer as described by claim 7 comprising the step of forming interfacing surfaces respective to said first and second end caps and said inlet and exit ends of said housing element into a plurality of meshing steps.

10. A method of fabricating a fluid flow line strainer as described by claim 7 comprising the steps of:

tapering internal walls of said second chamber to provide a transverse flow area that increases along said flow channel from said flow restrictive passage.

11. A method of fabricating a fluid flow line strainer as described by claim 10 wherein said tapering internal walls have fins projecting radially inwardly to a cylindrical passage space along said axis to confine said flow resistance element to axial movement within said cylindrical passage space.

12. A method of fabricating a fluid flow line strainer as described by claim 11 wherein said flow resistance element is a sphere displaced along said cylindrical passage space against the resilient bias of a spring by fluid flow along said flow channel.

* * * * *